United States Patent [19]

Buerli

[11] Patent Number: 5,069,544
[45] Date of Patent: Dec. 3, 1991

[54] ADAPTIVE PULSE WIDTH OPTICAL FAULT FINDER

[75] Inventor: Richard Buerli, Ventura, Calif.

[73] Assignee: Minnesota Mining and Manufacturing Company, St. Paul, Minn.

[21] Appl. No.: 508,844

[22] Filed: Apr. 12, 1990

[51] Int. Cl.$^5$ ............................................. G01N 21/88
[52] U.S. Cl. ................................................. 356/73.1
[58] Field of Search .................... 356/73.1; 250/227.15

[56] References Cited

U.S. PATENT DOCUMENTS

| | | | |
|---|---|---|---|
| 3,981,592 | 9/1976 | Williams | 356/237 |
| 4,070,118 | 1/1978 | Maslowski et al. | 356/237 |
| 4,197,007 | 4/1980 | Costa et al. | 356/73.1 |
| 4,212,537 | 7/1980 | Golob et al. | 356/73.1 |
| 4,289,398 | 9/1981 | Robichaud | 356/73.1 |
| 4,397,551 | 8/1983 | Bage et al. | 356/73.1 |
| 4,497,575 | 2/1985 | Philipp | 356/73.1 |
| 4,674,872 | 6/1987 | Wright | 356/73.1 |
| 4,685,799 | 8/1987 | Brininstool | 356/73.1 |
| 4,708,471 | 11/1987 | Beckmann et al. | 336/73.1 |
| 4,732,469 | 3/1988 | Souma | 356/731 |
| 4,743,753 | 5/1988 | Cheng et al. | 250/227 |
| 4,838,690 | 6/1989 | Buckland et al. | 356/73.1 |
| 4,870,269 | 9/1989 | Jeunhomme et al. | 250/227 |
| 4,898,463 | 2/1990 | Sakamoto et al. | 356/73.1 |
| 4,958,926 | 9/1990 | Bu-Abbud | 356/73.1 |
| 4,963,020 | 10/1990 | Luthra et al. | 356/73.1 |

FOREIGN PATENT DOCUMENTS

| | | |
|---|---|---|
| 2456293 | 6/1976 | Fed. Rep. of Germany . |
| 59-60337 | 4/1984 | Japan ............... 356/73.1 |
| 1560124 | 1/1980 | United Kingdom . |
| 2182222 | 5/1987 | United Kingdom . |

OTHER PUBLICATIONS

Three brochures depicting commercially available OTDR's —Model 5400XO from 3M Photodyne (copyright notice dated 1989—Model MW9010A from Anritsu (printing date 1989)—Model TFS2020 from Tektronix (printing date 10/89).

Article entitled "Optical Time-Domain Reflectometer Specifications and Performance Testing", by B. Danielson (from *Applied Optics,* v. 24, pp. 2313-2321, Aug. 1, 1985.

*Primary Examiner*—Vincent P. McGraw
*Attorney, Agent, or Firm*—Gary L. Griswold; Walter N. Kirn; Jack V. Musgrove

[57] ABSTRACT

An optical fault finder which optimizes the pulse width of the test signal which is transmitted through an optical fiber. The fault finder is an optical time domain reflectometer (OTDR) having a variable pulse width light source and associated timer. When a first test signal is launched down the optical fiber, a microprocessor within the OTDR detects any discrete losses and records the signal level at these faults. The OTDR then launches subsequent test signals whose pulse widths have been optimized according to the signal level at each fault. Also, a novel processing technique utilizes a matched filter to provide greater sensitivity to loss detection and location of the corresponding faults.

21 Claims, 5 Drawing Sheets

ADAPTIVE PULSE WIDTH OPTICAL FAULT FINDER

BACKGROUND OF THE INVENTION

1. Field of the Invention

The present invention generally relates to devices for testing the transmission quality of optical fibers, and more particularly to an optical time domain reflectometer having adaptive pulse width fault location.

2. Description of the Prior Art

In recent years, fiber optic cables have replaced traditional copper wire as the preferred medium for telecommunications. Although optical fibers have certain advantages over copper wire, they are still subject to faults which may result during installation of the fibers or from environmental factors after installation. Also, the practical length of an optical fiber is limited by attenuation of the light signals travelling therein, since there can never be 100% transmission of light through these fibers.

Accordingly, it is necessary to occasionally test the transmission quality of optical fibers. One device which has established itself as one of the more versatile instruments for this purpose is the optical time domain reflectometer, commonly referred to as an "OTDR." In its simplest construction, an OTDR includes a light source, such as a pulsed laser diode; an optical coupler, including a beam-splitter, connecting the light source to the near end of the fiber under test (FUT); and a photodetector positioned adjacent the beam splitter. When a test signal is sent down the FUT, backscattering and reflections within the fiber core return to the near end of the FUT and are sensed by the photodetector. The trace signal of the backscattering and reflections provides clues as to faults in the FUT. Numerous improvements have been made to this basic concept, some of which are disclosed in the following patents and applications:

| Patent/application | Applicant |
| --- | --- |
| U.S. Pat. No. 3,981,592 | D. Williams |
| U.S. Pat. No. 4,070,118 | Maslowski et al. |
| U.S. Pat. No. 4,197,007 | Costa et al. |
| U.S. Pat. No. 4,212,537 | Golob et al. |
| U.S. Pat. No. 4,289,398 | R. Robichaud |
| U.S. Pat. No. 4,397,551 | Bage et al. |
| U.S. Pat. No. 4,497,575 | H. Philipp |
| U.S. Pat. No. 4,674,872 | S. Wright |
| U.S. Pat. No. 4,685,799 | M. Brininstool |
| U.S. Pat. No. 4,708,471 | Beckmann et al. |
| U.S. Pat. No. 4,732,469 | M. Souma |
| U.S. Pat. No. 4,743,753 | Cheng et al. |
| U.S. Pat. No. 4,838,690 | Buckland et al. |
| U.S. Pat. No. 4,870,269 | Jeunhomme et al. |
| Brit. Pat. No. 1,560,124 | Standard Tel. & Cables |
| Brit. Pat. Appn. 2,182,222 | STC plc. |

The backscattered signal (also known as Rayleigh scattering) is typically weak, and is due to refractive-index fluctuations and inhomogeneities in the fiber core. The strength of the backscattered signal is primarily dependent on the peak power and width of the test pulse, i.e., a longer pulse width results in stronger backscattering. The backscattered signal may be used to detect faults such as micro-bends or splice losses, and to measure overall attenuation. In fact, attenuation is primarily due to backscattering, although it is also a function of the wavelength of the test pulse and any discrete losses along the fiber path.

Reflective signals (also known as Fresnel reflections) are somewhat stronger, and are due to discontinuities in the fiber. The strength of the reflected signal is primarily dependent upon the peak power of the test pulse. Reflective signals may be used to determine the overall length of the fiber line, and to detect breaks in the fiber, reflective connectors, and splices of fibers having different indices of refraction. Reflective signals also cause "deadzones," as explained more fully below.

Although the trace signal is a function of time (i.e., the amount of time passing from the initial test pulse until the return signal is detected), it can be directly correlated to positions along the FUT by the equation $x = ct/2n$, where x is the distance along the fiber, c is the speed of light in a vacuum, t is the elapsed time, and n is the index of refraction of the fiber material. Thus, the approximate location of a fault or splice may be determined.

A difficulty arises in locating faults, however, due to the deadzone created by Fresnel reflections. If two faults are in close proximity, their reflections and/or losses will overlap and may appear in the trace signal as a single fault. The theoretical length l of the deadzone is: $l = ct_{pw}/2n$, where $t_{pw}$ is the duration of the pulse width. For example, an OTDR emitting a 500 nanosecond pulse into an optical fiber having an index of refraction of 1.5 will result in a deadzone of about 50 meters, which is quite significant. Of course, other factors can exacerbate this effect, such as the response time of the photodetector, and the strength of any reflected signals.

In order to minimize the deadzone and thereby increase the effective resolution, a small pulse width may be selected. Prior art OTDR's provide for manual selection of pulse width from a set of a few discrete values. Some OTDR's provide a pulse width as small as one nanosecond. In minimizing the deadzone, however, other performance parameters of the OTDR are adversely affected. As noted above, micro-bends and splice losses are detected by means of Rayleigh scattering which is dependent on the pulse width. Hence, if relatively small pulse widths are employed, low loss microbends and splices may go undetected, although they would be distinguishable if the launch signal were longer. Attenuation in the fiber may make it difficult to detect distant faults, further mandating a longer pulse width. More broadly stated, a single trace may provide an optimal pulse width for one section of the fiber path, but the pulse width will not be optimal for the majority of the path. This presents a clear dilemma which prior art OTDR's have not adequately addressed.

The above problem relates only to the resolution of the OTDR for purposes of *detecting* the fault. Another problem occurs with respect to the precision of the OTDR in determining the location of any given fault along the fiber path. Early OTDR's merely provided a graphic display of the return trace signal from which only the crudest estimates could be made. Instruments have since been devised which can automatically detect and toggle through the approximate locations of losses, but they still require heavy user interpretation with respect to the specific location of any given fault.

For example, some prior art OTDR's employ digital sampling and analysis of the trace signal, and use a moving least-squares fit of several datapoints to calculate an average slope function. Logic circuitry examines this function for deviations which are greater than a preset threshold value, and records the elapsed time (i.e., the distance along the fiber) to the datapoint corresponding to the change in slope. The calculated distance, however, is usually not the actual distance to the fault. In order to more accurately define the specific point at which the fault occurs, human interaction is necessary. These prior art OTDR's allow the user to graphically estimate the fault location by moving a cursor on the display to the point along the trace signal corresponding to the beginning of the fault. This is, of course, a very subjective step and requires experience and training for an reliable measurement. It is clear that a simpler and more accurate technique for fault location is long overdue.

It would, therefore, be desirable and advantageous to devise an optical time domain reflectometer which overcomes the above limitations. Such an OTDR should provide automatic optimization of pulse width, and improved resolution in fault location. It should also be capable of multi-fault operation, and should calculate the loss value at the fault. Finally, minimal operator training and interaction should be required.

SUMMARY OF THE INVENTION

The foregoing objectives are achieved in an optical time domain reflectometer having means for computing an optimized pulse width based on the backscattered signal level at each fault. An initial signal is launched revealing one or more faults (reflections or losses). These faults are recorded, and then a series of signals are sent, one for each fault. The pulse width of each such signal is optimized for the particular fault being analyzed.

The OTDR also employs a novel fault location method including use of a digital matched filter and a "clipping" filter which removes reflections along the trace signal. This technique improves accuracy in determination of the distance to the fault, and may optionally be used to calculate the amount of any loss. After the device has recorded and calculated this information, a display conveys the essential data to the user in a sequential manner for each fault. For added flexibility, the device may be programmed by the user with such information as the index of refraction of the fiber, threshold loss levels, and output units.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
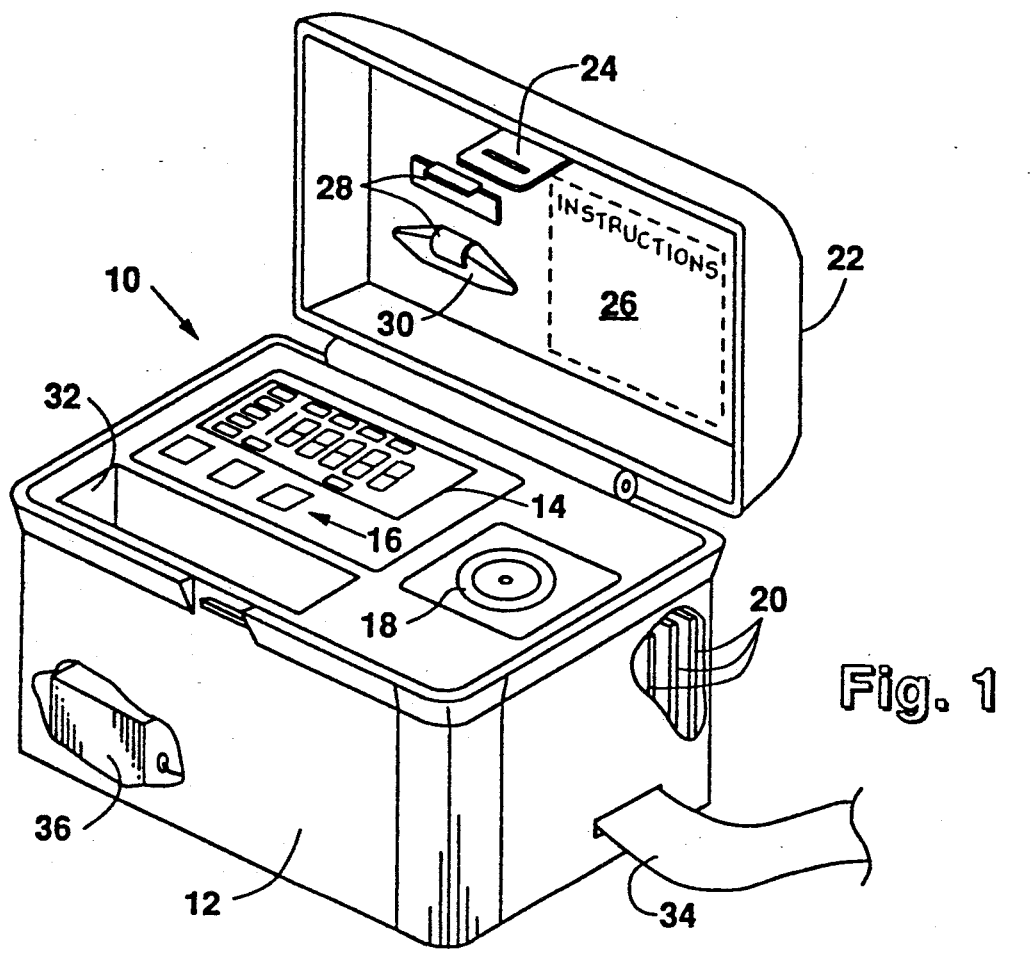
FIG. 1 is a perspective view of an optical fault finder constructed in accordance with the present invention, with cutouts to illustrate interior elements.

With reference now to the figures, and in particular with reference to FIG. 1, there is depicted an optical time domain reflectometer (OTDR) 10 of the present invention. OTDR 10 is generally comprised of a housing 12, a display 14, a keyboard 16, a port 18 for receiving the optical fiber to be tested, and associated electronics mounted on internal circuit boards 20. Housing 12 is constructed of any durable material such as polycarbonite, and includes a lid 22 having a latch 24. Housing 12 forms a watertight container when lid 22 is closed. The inner surface of lid 22 may include a printed instruction summary 26, or have attached thereto one or more clips 28 for retaining small accessories such as an optical splice connector 30. Housing 12 may further include a recessed cavity 32 for storing other accessories, and be provided with a carrying strap 34. While OTDR 10 may be adapted for connection to an external power source, the disclosed embodiment includes a portable power supply, i.e., battery 36.

Figure 2:
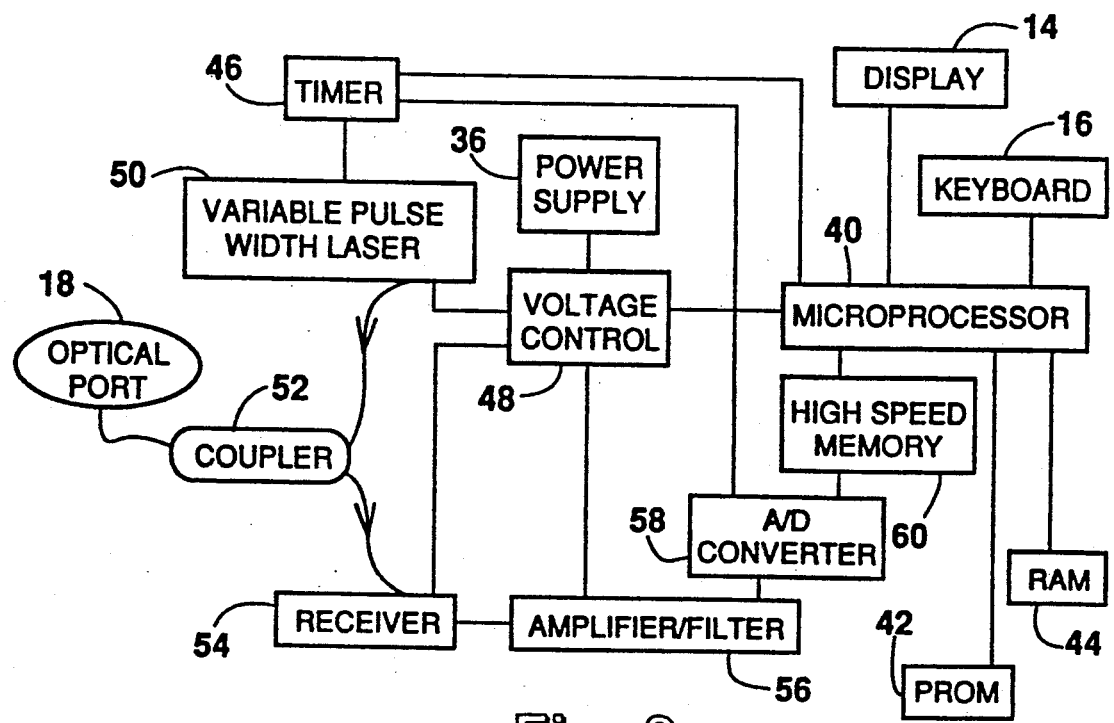
FIG. 2 is a block diagram of the electrical and optical subsystems of the present invention.

Referring now to FIG. 2, a block diagram of the electronics of OTDR 10 is explained. The electronic system includes a microprocessor 40 connected to a programmable read-only memory unit (PROM) 42, a random-access memory unit (RAM) 44, and a timer 46. Microprocessor 40 is also connected to the display 14 and keyboard 16, and to power supply 36 via a voltage control 48. In the disclosed embodiment, microprocessor 40 is an integrated circuit commonly known as a 68000 processor, available from Motorola Corp., Hitachi Inc., or Toshiba Corp. Power supply 36 comprises a set of six 1.2 volt batteries (nickel-cadmium rechargeable "D" cells). Voltage control 48 is a DC/DC converter, and provides a five volt output to microprocessor 40. As those skilled in the art will appreciate, however, use of the specific components described herein is not meant to be limiting of the present invention; rather, these components are merely deemed preferable in the use of OTDR 10.

Microprocessor 40 is used to control timer 46 which in turn regulates a variable pulse width light source 50. In the preferred embodiment, timer 46 utilizes a 20 megahertz clock, and light source 50 is a laser diode having an output wavelength of 1300 nanometers at a peak power of 10 milliwatts. Such a laser diode is available from STC plc. of England under model number LP3SA10-18. Other wavelengths besides 1300 nm are acceptable, and OTDR 10 may optionally be provided with multiple light sources of different wavelengths to target the test results for specific operating conditions. Inasmuch as 1300 nm is outside the visible spectrum (as are most wavelengths used in optical fiber technology), it should be understood that the term "light" as used herein means a source of electromagnetic radiation of any wavelength which may be transmitted through a waveguide. Voltage control 48 also supplies 12 volt power to light source 50.

Light source 50 is connected to the fiber under test (FUT) by means of a 3-way optical coupler 52 and port 18. Actually, these two components are preferably combined into one integral coupler/port. Combined coupler/ports are available from Amphenol Corp. of Lisle, Ill., under model number 945J, and from Gould Electronics of Glen Burnie, Md. The laser diode comprising light source 50 is provided with a "pigtail" (a short section of optical fiber), and connected to the input of coupler 52 by means of a FIBERLOK brand splice connector (FIBERLOK is a trademark of Minnesota Mining & Manufacturing Company, assignee of the present invention). The primary output of coupler 52 is connected to port 18, while the secondary output is connected to a receiver 54.

In the preferred embodiment, receiver 54 is an avalanche photodiode manufactured by Fujitsu Corp. of Japan under model number FPD13U51WX. It is, of course, imperative that the fiber from coupler 52 be properly aligned with the sensor of receiver 54 in order to maximize receiver sensitivity. The output of receiver 54 is directed to an amplifier/filter 56 which provides signal conditioning. Conventional amplifiers and filters may be used to increase the gain of the return signal and filter out any unwanted signals. The inventor uses a three-stage amplifier. The first stage consists of a transimpedance amplifier used to capture the signal from the avalanche photodiode with maximum performance characteristics. This stage also provides clamping which is used to cut off excessively high signals (e.g., reflective signals greater than 2 volts). The second and third stages consist of operational amplifiers and merely raise the gain of the return signal. The filter, which is built in to the amplifier, is simply a low-pass filter which cancels high-frequency noise (e.g., greater than 16 megahertz). Voltage control 48 supplies 150 volt power to receiver 54, and further provides ±12 volts to amplifier 56.

The output of amplifier/filter 56 (in the range of zero to two volts) is sampled by an analog-to-digital converter 58 (whose output is a digital value between zero and 255). The sampling rate may vary as a function of the desired resolution, the amount of available memory, and the switching speed of the electronics. It is anticipated that a sampling rate of 100 nanoseconds will be sufficient for most applications; this is hard-wired into timer 46 which controls operation of A/D converter 58. Unfortunately, such a small increment makes it difficult for microprocessor 40 to adequately handle the data due to switching limitations. Therefore, a high-speed memory unit 60 (static RAM) is integrally provided with A/D converter 58, having about 4096 bytes of memory (16 bit). An acceptable high-speed chip may be obtained from Performance, Inc. of Sunnyvale, Calif., under model number P4C1682. Assuming a sampling rate of 100 ns and an index of refraction of 1.5 for the FUT, this amount of memory would be sufficient to store data for a fiber path of up to fifty kilometers. More memory may be provided if a shorter sampling rate, or a longer fiber path, were necessary. Of course, if a microprocessor having a faster switching speed were used, then RAM 44 could store this information, and a separate high-speed memory would be unnecessary.

Microprocessor 40 is controlled by the program code which is stored in PROM 42. This code may allow for user inputs (such as the value of the index of refraction for the FUT) as explained further below. After such information has been entered, microprocessor 40 initiates the test by instructing timer 46 to launch a test signal, such as a 50 ns pulse, which is accordingly transmitted by light source 50. This pulse is conveyed to the FUT by means of Coupler 52 and port 18. Backscattering and reflections are returned down the FUT to port 18, and conveyed thence from coupler 52 to receiver 54. The return trace signal is processed by amplifier/filter 56, and digital values are computed and stored by A/D converter 58. Microprocessor 40 then uses these raw datapoints to calculate backscattering and discrete losses due to faults, as discussed more fully below.

In order to obtain more reliable data, the test signal may be launched several times and the datapoints averaged. This reduces the effects of noise and statistical sampling, i.e., improves the effective signal-to-noise ratio (SNR). The test signal is preferably launched 256 times, yielding an effective improvement in the SNR of about 12 decibels. As each successive trace signal is returned, the datapoints from that signal are respectively added to the datapoints from the previous signals. In this regard, it is desirable to include a 16-bit adder (such as a 74F283 chip) with the A/D converter and high-speed memory 58. The final sums of these values may be divided by 256 to yield average values but, since the results of the data analysis are given in a logarithmic (i.e., decibel) scale, there is actually no need to so divide the sums of the datapoints. Thus, the summed values are delivered to microprocessor 40 for further data analysis.

While the foregoing construction has significant novelty, the heart of the invention actually lies in further enhancements to data acquisition and analysis. As discussed in the Description of the Prior Art, there are practical limitations to the sensitivity of OTDR's due to the deadzone, which is a function of pulse width. The present invention overcomes these limitations by adaptively adjusting the pulse width based on the measured backscatter level at the point of interest. The pulse width is optimized for each fault in the following manner.

The initial pulse launched by light source 50 is preferably short in duration, e.g., 50 ns, to optimize accuracy with respect to close faults. The original return trace signal is analyzed (as described further below) to identify reflections and other losses. OTDR 10 then focuses on the first (closest) fault, determining the signal level at that point. If the measured signal level is too low (due to attenuation or other losses in the fiber path), then the test signal is launched again with a larger pulse width. On the other hand, if the measured signal level is too high, a new test signal is launched with a smaller pulse width. This comparison is performed by microprocessor 40.

In this regard, the range of acceptable signal levels may be established in different ways. In the preferred embodiment, the acceptable minimum and maximum signal levels are based on the average background noise. Specifically, the minimum acceptable measured signal is about 3 dB above the background noise, and the maximum acceptable measured signal is about 9 dB above the background noise. In other words, if the measured signal in the vicinity of the fault under investigation is less than 3 dB above background noise, then another test signal will be launched with a longer pulse width; if the measured signal is greater than 9 dB above background noise, then the relaunched signal will have a shorter pulse width. This range is preferable although it may be narrowed or expanded.

If the signal level is to be analyzed with respect to the background noise level, it is necessary to calculate the noise level. This may be computed using various methods. The inventor chooses to examine a portion of the trace signal beyond the end of the fiber (i.e., that portion of the signal which takes more than about 400 microseconds to return to OTDR 10), since this portion of the signal represents pure noise. One hundred datapoints beyond this position are sampled and averaged to give the background noise value. This calculation is performed each time the pulse width is adjusted to correlate current measured signals to current noise values.

Once it has been determined that the pulse width is too short or too long, a suitable adjustment to the pulse width must be made. This may be accomplished by simply increasing or decreasing the pulse width by a fixed increment, e.g., 50 ns. This technique, however, would not necessarily place the measured signal in the acceptable range, and reiterations might be necessary. Therefore, an alternative technique may be used which has been found to decrease optimization time. This technique requires that the pulse width be increased by an increment $t_{inc}$ according to the empirical formula:

$$t_{inc} = [(pw_{old}/250) + 1] \times 50$$

where $pw_{old}$ is the duration of the old pulse width in nanoseconds, and the increment is given in nanoseconds. For simplicity, the division by 250 is an integer division, i.e., the quotient is rounded down to a whole number. This calculation is performed by microprocessor 40. The increment used in decreasing pulse width is based on the same formula, with the minor change of dividing the old pulse width by 200 rather than by 250.

For example, assume that the original launched pulse was 50 ns, but the measured signal at the first fault was below the minimum acceptable value. Using the above formula, an increment of 50 ns is calculated which, when added to the old pulse width of 50 ns, yields a new pulse width of 100 ns. As another example, assume a larger pulse width of 1 $\mu$s had been transmitted, and that the measured signal at the fault under investigation was above the maximum acceptable value. The above formula would indicate a decrease of 250 ns, yielding a new pulse width of 750 ns.

As those skilled in the art will appreciate, if two faults are closely spaced together, an increase in the pulse width might "erase" the second fault since the deadzone would overlap both faults. In order to avoid this result, microprocessor 40 computes the estimated deadzone for the new pulse width prior to its being launched. If the new pulse width would so erase a fault, the optimization routine is overridden and the last trace is used to analyze both faults. Alternatively, if enough memory (RAM 44) is available, the last trace may be stored for later analysis with respect to the erased fault. The optimization routine could then be performed for all other faults.

With appropriate control electronics, the pulse width may accordingly be varied in an effectively continuous manner. As a practical matter, however, it is convenient to store the time periods of the various pulse widths in PROM 42, meaning that a finite number of settings will be available. Moreover, due to limitations of light source 50, some settings may be inappropriate For example, the laser diode previously mentioned is designed for a maximum duration of six $\mu$s at peak power. Use of this laser diode for periods longer than six $\mu$s can result in serious degradation of the diode, although other laser sources may be used to provide a pulse width of up to 20 $\mu$s. Also, the minimum practical setting is 50 ns, although smaller settings are conceivable.

Once the optimum pulse width for the first fault is established, microprocessor 40 instructs light source 50 (via timer 46) to launch a new test signal (actually, to launch a series of 256 pulses as explained above). Of course, the original 50 ns pulse may already be optimum for the first fault. If, however, a new pulse is launched, then the resulting trace *replaces* the original trace. This replacement trace is processed in the same manner as the original trace (discussed more fully below) to redefine the locations of any faults. The signal level at the first fault is then reexamined to confirm that the new pulse width is indeed optimal (i.e., the measured signal level is within the acceptable range). If not, the optimization routine is repeated. Once optimization of the pulse width for the first fault is confirmed, the trace signal is analyzed further to determine its exact location and the associated signal loss.

After analysis of the first fault is completed, attention shifts to the second fault. The same optimization routine is used to determine the best pulse width for the second fault; light source 50 emits another series of pulses and the resulting trace again replaces the previous trace. The latest trace is similarly analyzed to redefine all fault locations, to confirm optimization for the second fault, and to calculate the loss at that fault. This process is repeated for as many faults as are detected. If no faults at all are initially found, the test signal may be successively relaunched at longer pulse widths, up to the maximum of 6 $\mu$s.

The above procedure has clear advantages over prior art OTDR's. The optimization of pulse width provides better resolution of closely spaced faults without reducing sensitivity to losses. The dynamic range of OTDR 10 is thus extended since dynamic range is a function of both peak power and pulse width, and this is accomplished without excessive amplification of the trace signal which would result in a lower signal-to-noise ratio. Nevertheless, there is still room for improvement, namely with respect to threshold detection and location of losses. The preferred embodiment of the present invention additionally provides means for improving the accuracy of fault detection and location, independent of pulse width optimization.

This improvement is achieved by the use of a "matched" filter. A matched filter, which is a non-linear function, is known in digital processing, and sequentially focuses on a given datapoint and a certain number of datapoints on either side thereof. In the preferred embodiment, the matched filter sequentially operates on five datapoints in the trace signal: the central or reference point, the two preceding datapoints, and the two succeeding datapoints. For each reference point, a matched filter function $f_{mf}$ is created according to the equation:

$$f_{mf} = (p_1 + p_2) - (s_1 + s_2)$$

where $p_1$ and $p_2$ are the values of the two preceding datapoints, and $s_1$ and $s_2$ are the values of the two succeeding datapoints. The matched filter function generates a peak whose baseline height is proportional to the loss at the fault.

One further refinement is necessary to the above technique. The number of datapoints being analyzed by the matched filter is actually a function of pulse width. Specifically, the central or reference point should be at least as long as the pulse width. For example, if the pulse width is 100 ns, it is only necessary to use one reference point since the sampling time (i.e., datapoint width) is 100 ns. If, however, a 500 ns pulse width were used, then the central or reference point must be expanded to five reference points. In either case, only four other points are analyzed, viz., two on the left of the reference group, and two on the right of the reference group.

The response of such a filter upon a non-reflective loss is optimal. Unfortunately, however, a matched filter is overly sensitive to reflections and will give erroneous loss readings at reflective faults. Therefore, in order to use the matched filter to detect reflective as well as non-reflective losses, the inventor has devised a "clipping" filter to remove reflected signals from the trace. The clipping filter simply flattens out any rising signals caused by reflections. This is accomplished by presetting a minimum threshold for detecting the rising edge of the reflection, such as a 0.5 dB increase in the signal above the backscatter level in the vicinity of the reflection.

Figure 3:
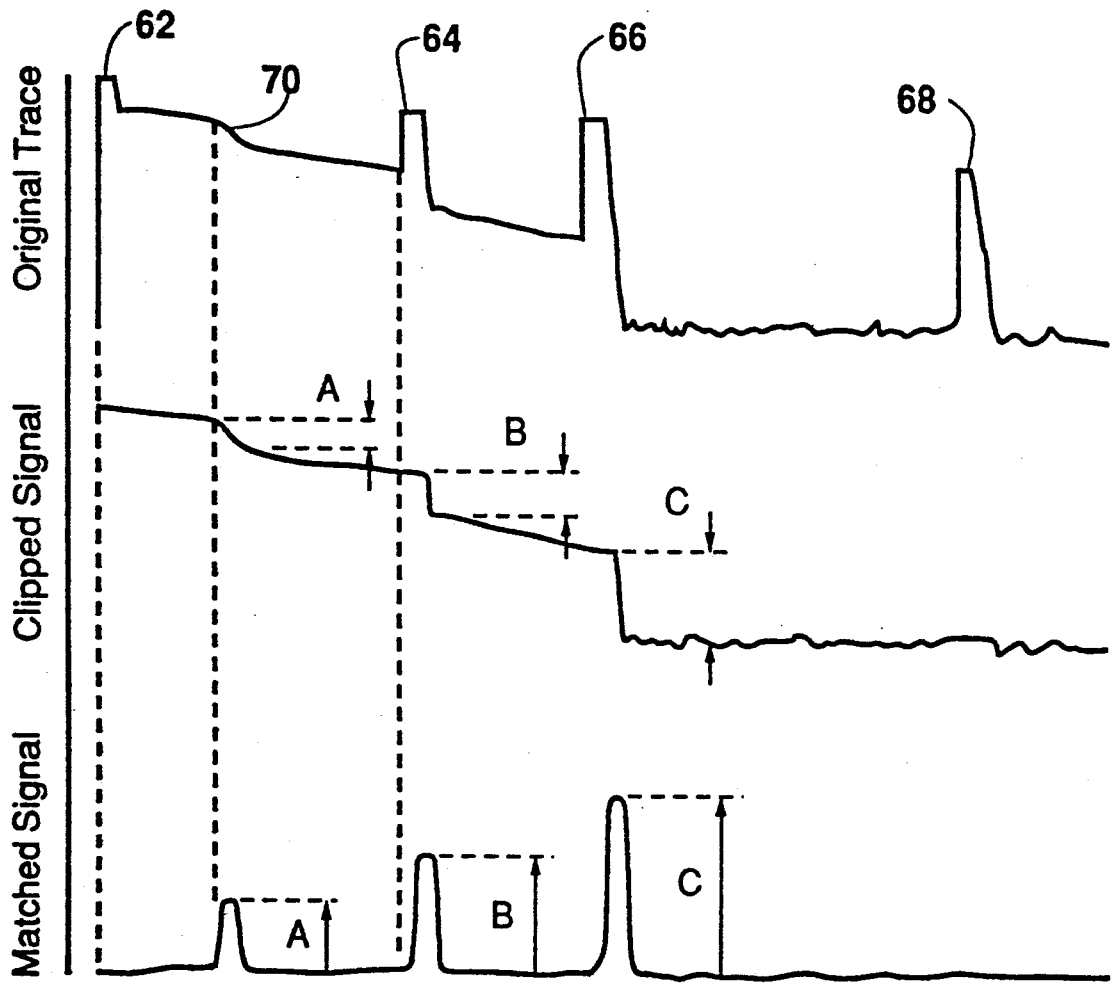
FIG. 3 is a graph showing an original trace signal, and corresponding signals generated by the clipping and matched filters.

The clipping and matched filters may be understood with reference to FIG. 3, which depicts the original trace signal, and associated clipped and matched signals. Whenever the original trace signal rises above the clip threshold, the clipping filter replaces the datapoints corresponding to the reflection with a flat line, i.e., the value of the backscatter level preceding the reflection. Once the trace signal returns to or below this level, clipping discontinues. In this manner, reflective signals are flattened out, such as the reflection 62 caused by coupler 52, the reflection 64 caused by a previously unknown connector, splice or break, the reflection 66 caused by the terminal end of the fiber path, and the ghost reflection 68. As with the matched filter, the clipping filter routine is performed by microprocessor 40. Additional processing may optionally be provided to calculate the intensity of the reflection, prior to the clipping routine.

The output of the clipping filter is fed to the matched filter, which generates the matched signal shown in FIG. 3. Any peaks in the matched signal correspond to the approximate location of, and are proportional to, losses along the fiber path. This is true whether the loss was a non-reflective fault 70 (loss value represented by the height A of the peak), or whether it was a reflective loss, as with reflection 64 (loss value represented by the height B of the peak). The matched signal may easily be processed to determine the actual loss at each fault; however, the inventor has found that the prior art technique of curve-fitting more accurately determines the exact loss. This is a conventional technique, which simply calculates the slope of the trace before and after the fault, using a least-squares fit. The difference between the two approximated lines at the location of the fault is indicative of the loss.

The user may, however, only be interested in faults above a certain loss threshold. As further explained below, the loss threshold may be selected by the user prior to testing of the fiber. Microprocessor 40 is accordingly programmed to record only those losses above the threshold. Also, the matched filter will ignore the "fault" 66 at the terminal end of the fiber path since the length of the fiber is known (as discussed below), and the program stored in PROM 42 instructs the matched filter to only process data up to that point.

The foregoing explanation illustrates the technique used for detecting faults and calculating any attendant loss, but it is also necessary to establish the location of the faults along the fiber path. This is easily accomplished by one of two methods, depending on whether the fault was reflective or non-reflective. If the fault was reflective, then the leading edge of the reflection (the first datapoint to rise 0.5 dB above the backscatter level) can be recorded by microprocessor 40 during the clipping routine. The leading edge of the reflection corresponds nearly exactly to the location of the fault. For non-reflective losses, the location of the fault corresponds to the leading edge of the peak in the matched signal. This datapoint may be identified by detection of a rise in the match signal of, say, 0.1 dB above the matched signal baseline. Use of the clipping and matched filters therefore provides a simpler, quicker, and yet highly accurate technique for detection and location of losses along the FUT.

It is understood that the clipping and matched filters, while extremely useful in the disclosed embodiment, are independent of the pulse width optimization feature. In fact, an OTDR could be designed which would use pulse width optimization, but would not calculate the distance to the fault or the fault loss at all. For example, the simplest prior art OTDR's merely provide a graphic display of the trace signal; such an OTDR could be modified to incorporate pulse width optimization without providing details on fault distance and loss.

Operation

Figure 4:
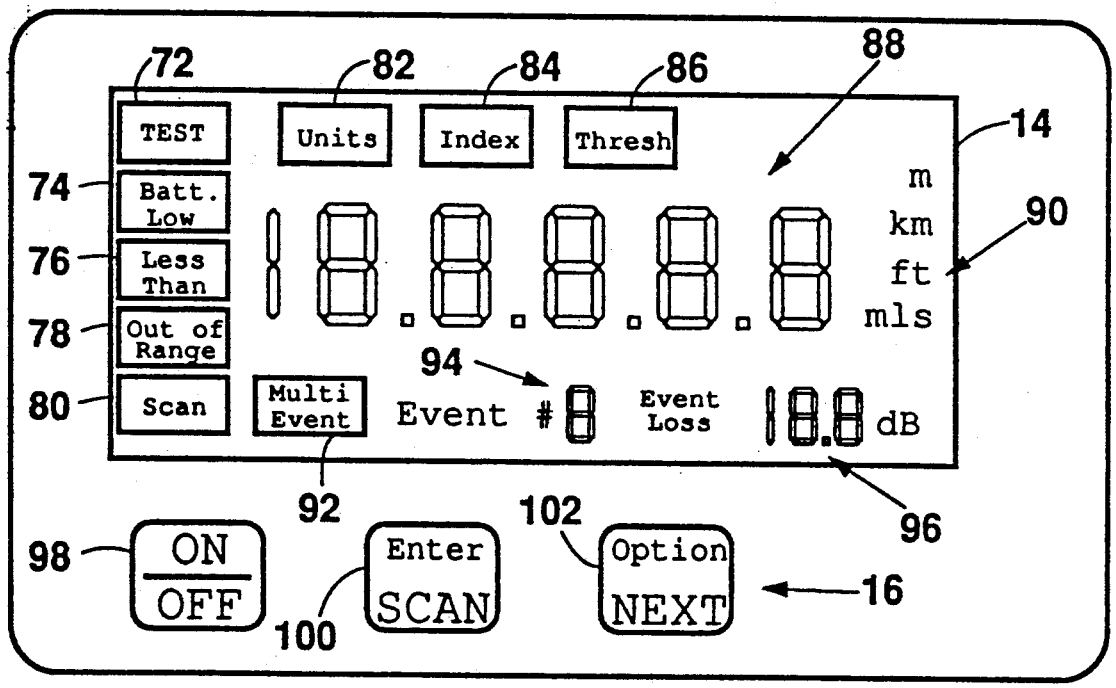
FIG. 4 is a top plan view of the display used in one embodiment of the present invention.
Figure 5:
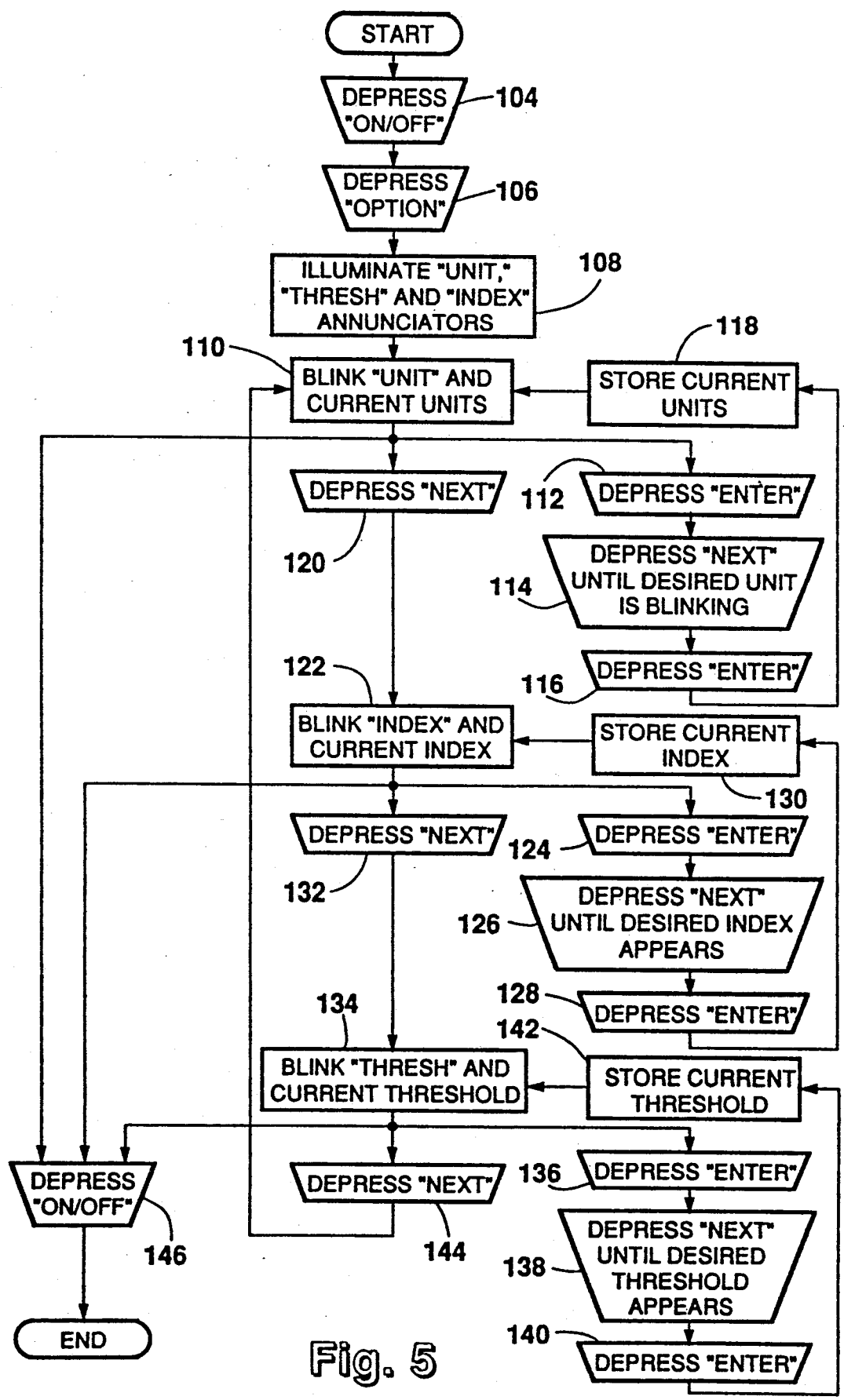
FIG. 5 is a flow chart depicting the programming steps for preparation of the OTDR.
Figure 6:
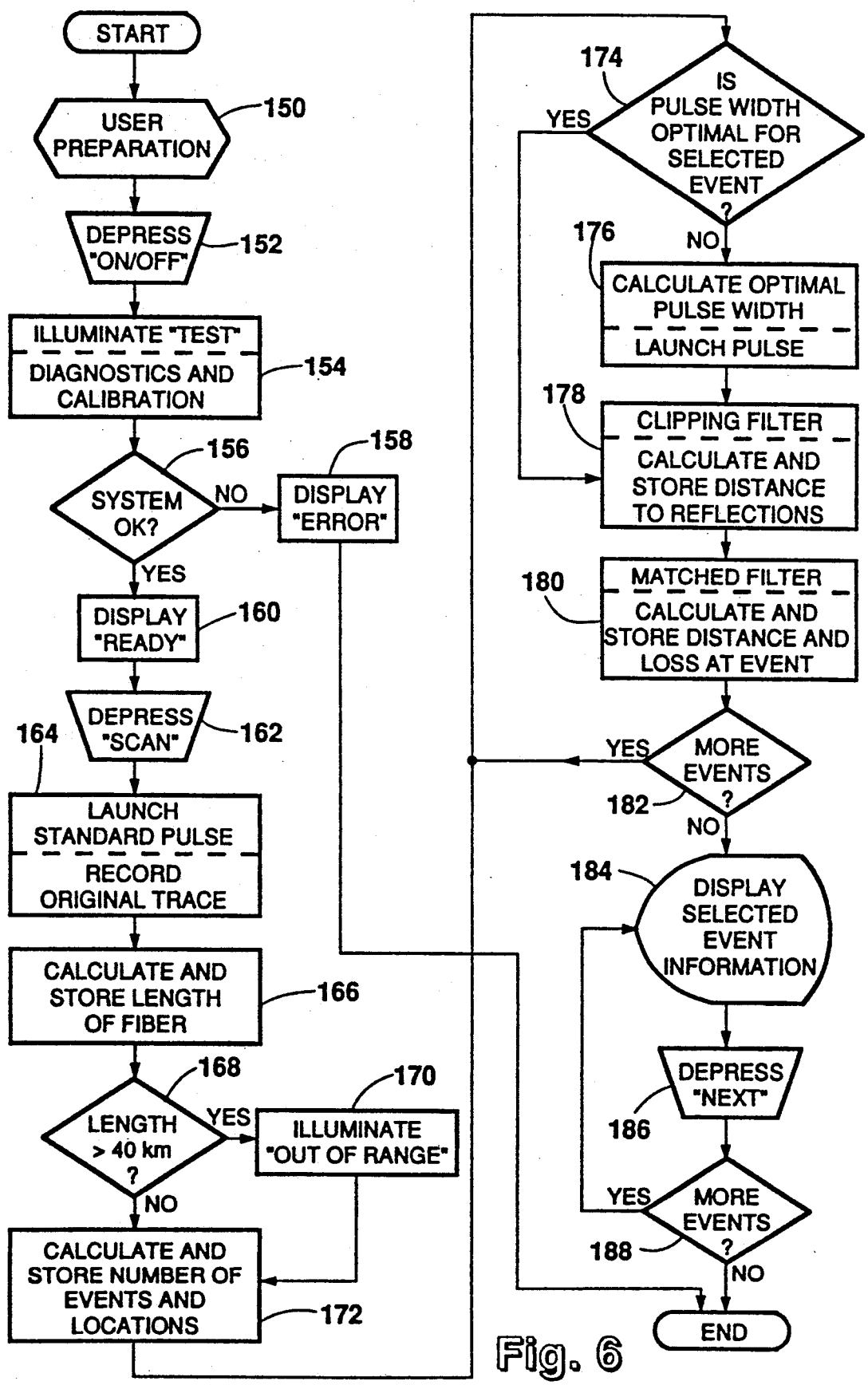
FIG. 6 is a flow chart illustrating the steps performed by the OTDR in detection and location of faults along the fiber path, including pulse width optimization and use of a matched filter and clipping filter.

Operation of OTDR 10 may best be understood with reference to FIGS. 4, 5 and 6. An exemplary form of display 14 and keyboard 16 is shown in FIG. 4. Display 14 comprises a liquid crystal display (LCD), including a plurality of annunciators and numeric display fields. Two indicators which are used for diagnostic purposes are a "TEST" annunciator 72 and a "Batt. Low" annunciator 74. "TEST" annunciator 72 is illuminated during the diagnostic self-tests of OTDR 10. The "Batt. Low" annunciator 74 is illuminated whenever the voltage of portable power supply 36 drops below about 6.2 volts. Two other indicators relate to the distance to a given fault. A "Less Than" annunciator 76 is used to indicate the presence of a fault close to the near end of the FUT, e.g., within fifty meters. An "Out of Range" annunciator 78 is used to indicate that the terminal end of the fiber path is beyond the range of OTDR 10, i.e., longer than about fifty kilometers. The last indicator along the left side of display 14 is a "Scan" annunciator 80 which is illuminated during the measurement operations.

Three indicators along the top of display 14 are used when programming user inputs. A "Units" annunciator 82 is illuminated when the user is defining the linear units in which the distance to a fault is given. An "Index" annunciator 84 is illuminated when the user is inputting the index of refraction of the FUT. A "Thresh" annunciator 86 is illuminated when the user is setting the minimum threshold for loss detection.

The main portion of the display comprises a numeric field 88 for displaying the distance to a fault. Adjacent this field is a units field 90 including abbreviations for units of meters, kilometers, feet, and miles. Only one of the units in field 90 will be illuminated, according to the user selection. Below these fields are a "Multi Event" annunciator 92, an event number field 94, and a numeric field 96 for the event loss, which is given in decibels.

In the preferred embodiment, keyboard 16 includes only three keys, namely, "ON/OFF" key 98, "Enter/SCAN" key 100, and "Option/NEXT" key 102. These keys are used to control microprocessor 40 and to enter physical parameters as discussed in conjunction with FIGS. 5 and 6. As will become apparent, user interface with OTDR 10 is simplified by providing dual functions for keys 100 and 102, depending upon the particular mode the unit is in when these keys are depressed.

Referring now to FIG. 5, a flow chart of the user programming of OTDR 10 is explained. The user may input various parameters to refine the test for the particular conditions surrounding each trial. The coding for this program is contained in PROM 42. The first step (104) is to turn on the unit by depressing "ON/OFF" key 98. While not depicted in this flow chart or in FIG. 6, it is understood that OTDR 10 can be provided with a feature to automatically turn the unit off if a certain period of inactivity has passed. The user then accesses the input program (106) by depressing "Option/-NEXT" key 102 for longer than two seconds. This results in illumination (108) of the parameter annunciators 82, 84 and 86.

The first parameter which OTDR 10 solicits is the units in which the distance is to be displayed. Accordingly, "Units" annunciator 82 begins blinking (110), along with the current selected units in field 90. If the user desires to change the units, "Enter/SCAN" key 100 is depressed (112). This allows toggling between the various units by depression of "Option/NEXT" key 102. As that key is depressed, the different units in field 90 will begin blinking to indicate current selection (114). When the desired unit is blinking, "Enter/SCAN" key 100 is again depressed (116). The current units are then stored (118) in RAM 44. A backup battery (not shown) may be provided to maintain power to RAM 44 when the unit is otherwise turned off. Program logic then returns to step 110, meaning that the user can still change his mind and repeat the above steps if, on second thought, a different unit is deemed desirable.

Once the proper units have been chosen, "Option/-NEXT" key 102 may be depressed (120) to advance the program to allow selection of the index of refraction. This selection routine is very similar to that for the units. First, "Index" annunciator 84 begins blinking, and the current index of refraction is displayed (122) in numeric field 88. If the user desires to change the index, "Enter/SCAN" key 100 is depressed (124). The current index of refraction will be displayed in field 88. The index may be adjusted by depression of "Option/-NEXT" key 102. In the disclosed embodiment, the range of possible values is from 1.400 to 1.600. Depressing "Option/NEXT" key 102 will increase the index in increments of 1/1000 (126). In order to speed up this selection process, stepping through these values shifts to a "fast" mode if "Option/NEXT" key 102 is held down for more than two seconds. When the desired index of refraction appears, "Enter/SCAN" key 100 is again depressed (128). The current index is then stored (130) in RAM 44. This returns the program logic to step 122, allowing a second chance to revise the index if the previous selection was in error.

Once the proper index has been chosen, "Option/-NEXT" key 102 may be depressed again (132) to advance the program and allow selection of the fault loss threshold. This selection routine is also similar to that for the units and index of refraction. First, "Thresh" annunciator 86 begins blinking, and the current fault loss threshold is displayed (134) in numeric field 88. If the user desires to change the loss threshold, "Enter/-SCAN" key 100 is depressed (136). The current threshold will be displayed in field 88. The threshold may be adjusted by depression of "Option/NEXT" key 102. As that key is depressed, different values will be displayed in field 88 to indicate the currently selected threshold (138). In the disclosed embodiment, the threshold may be increased in increments of 0.5 dB, within the range of 0.5 dB to 6.0 dB. When the desired fault loss threshold appears, "Enter/SCAN" key 100 is again depressed (140). The current threshold is then stored (142) in RAM 44. This returns the program logic to step 134, allowing a second chance to revise the threshold if the previous selection was in error. "ON/OFF" key 98 may be depressed at steps 110, 122 or 134 if no other parameters are to be changed. Doing so will exit the input parameter program.

With further reference to FIG. 6, the test and measurement procedure of OTDR 10 is depicted in the form of another flow chart. The test procedure begins with user preparation (150). This may include the programming steps set forth in FIG. 5, and includes other operations such as connecting the near end of the FUT to optical port 18. OTDR 10 may be used to test fibers having a wide variety of purposes, such as a telephone cable, a telecommunications link in a local area network, or a data transmission line in a vehicle such as a plane or boat.

Once user preparation is complete, "ON/OFF" key 98 is depressed (152). Microprocessor 40 then illuminates "TEST" annunciator 72 and executes the diagnostic and calibration programs (154), and returns a flag to indicate the status of the system (156). If the flag indicates a failure in the system, the word "ERROR" is displayed in field 88 along with an internal error code, and the program is aborted (158). Otherwise, the program continues by displaying a "READY" prompt (160). When the user is also ready, "Enter/SCAN" key 100 is depressed (162).

Depression of "Enter/SCAN" key 100 initiates the first test pulse (50 ns). As explained above, a series of 256 pulses is actually sent. The trace signal from this series is then recorded (164). Microprocessor 40 first analyzes the trace to calculate the total length of the fiber path (166). If the length is greater than forty kilometers, "Out of Range" annunciator 78 is illuminated and remains illuminated for the remainder of the test (168, 170). The length of the fiber path is determined by detection of the trailing edge of the trace signal. A preset threshold (e.g., 1.7 dB) above background noise is used to detect the trailing edge.

After OTDR 10 has calculated the length of the fiber path, it locates all faults using the clipping and matched filters described above (172). Microprocessor then examines each fault individually to determine the optimal pulse width for each event (174). If the previous pulse width was not optimal, a new pulse width is calculated and another series of pulses are launched (176). The clipping and matched filters are utilized again to detect and locate the faults, and the loss at the event under inspection is calculated by the curve-fitting technique described above (178, 180). This procedure is repeated for each event (182). After all events have been logged, information on the first event (distance in field 88 and loss in field 96) is displayed (184). If there are multiple events, then "Multi Event" annunciator 92 is illuminated and the sequential number of the event is displayed in field 94. When "Option/NEXT" key 102 is depressed (186), information on the next event is displayed (188). The length of the fiber may optionally be displayed as the last "event." Since there is no real fault at the end of the fiber, the loss field 96 becomes extraneous; OTDR 10 advantageously uses field 96, however, to indicate that the distance given in field 88 is the length of the fiber, by displaying an unusual symbol in loss field 96, such as two minus signs "— —".

The foregoing description sets forth a novel and advantageous design for an optical time domain reflectometer. It provides automatic detection of faults, including improved accuracy in location. Most importantly, the device is simple to use, requiring minimal operator training and interaction.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, although no graphic display of the trace signal is provided in the disclosed embodiment, the invention could easily incorporate an optional printer/plotter or a display (CRT) for output of graphic results. The invention could also be adapted for use with a remote light source which is connected to the far end of the FUT. It is therefore contemplated that the appended claims will cover such modifications that fall within the true scope of the invention.

I claim:

1. A device for detecting faults in an optical fiber, comprising:
   means for receiving an optical signal emanating from a near end of the optical fiber, said optical signal resulting from the propagation of a first test pulse through the optical fiber, and said optical signal including at least one discrete loss having an associated signal level;
   means for optically coupling said receiving means to the near end of the optical fiber; and
   processing means electrically connected to said receiving means for computing an optimized pulse width for a second test pulse, based on said signal level at said discrete loss.

2. The device of claim 1 further comprising:
   means for emitting a light pulse, said emitting means being optically connected to the near end of the optical fiber by said coupling means; and
   timer means for regulating the width of any light pulse emitted from said emitting means, said processing means being connected to said timer means and further directing said emitting means to launch said second test pulse having said optimized pulse width.

3. The device of claim 1 wherein:
   said discrete loss in said optical signal corresponds to a fault in the optical fiber; and
   said processing means further calculates (i) the approximate distance to said fault, and (ii) the approximate value of said discrete loss.

4. The device of claim 2 wherein said optical signal has a plurality of discrete losses corresponding to faults in the optical fiber, and said processor means:
   estimates the length of a deadzone associated with said optimized pulse width;
   calculates the approximate distances between each adjacent fault pair; and
   overrides said launch of said second test pulse if said deadzone length is approximately equal to or greater than any of said distances.

5. The device of claim 2 wherein:
   said first test pulse has a known first pulse width; and
   said optimized pulse width is greater than said first pulse width if said signal level is below a specified minimum value.

6. The device of claim 2 wherein:
   said first test pulse has a known first pulse width; and
   said optimized pulse width is less than said first pulse width if said signal level is above a specified maximum value.

7. The device of claim 3 further comprising means for displaying said distance and said loss value.

8. The device of claim 3 wherein said processing means further includes matched filter means for calculating said distance and loss value.

9. The device of claim 6 wherein said optimized pulse width is greater than said first pulse width if said signal level is below a specified minimum value.

10. The device of claim 9 wherein said minimum and maximum values are based on the average background noise of said optical signal.

11. A fault finder for testing an optical fiber, comprising:
   a light source;
   timer means for pulsing the output of said light source;
   an optical coupler connecting said light source to a near end of the optical fiber;
   a receiver connected to said optical coupler for detecting an optical signal emanating from the near end of the optical fiber, said optical signal resulting from backscattering and reflections caused by the propagation of a first light pulse through the optical fiber, said first light pulse having a first pulse width;
   processing means for computing an adjusted pulse width based on a signal level at a discrete loss in said optical signal, and further based on the value of said first pulse width; and
   means for supplying power to said light source and said processing means.

12. The optical fault finder of claim 11 wherein said optical signal has a plurality of discrete losses corresponding to faults in the optical fiber, and said processor means further:
   estimates the length of the deadzone associated with said adjusted pulse width;
   calculates the approximate distances between each adjacent fault pair; and
   directs said timer means to launch a light pulse having said adjusted pulse width if said deadzone length is less than any of said distances.

13. The optical fault finder of claim 11 wherein said adjusted pulse width is (i) greater than said first pulse width if said signal level is below a specified minimum value, or (ii) less than said first pulse width if said signal level is above a specified maximum value.

14. The device of claim 11 wherein said discrete loss in said optical signal corresponds to a fault in the optical fiber, said processing means further calculating (i) the approximate distance to said fault, and (ii) the approximate value of said discrete loss.

15. The optical fault finder of claim 11 further comprising keyboard means for activating said processing means and for entering physical parameters used by said processing means.

16. The optical fault finder of claim 11 wherein said processing means includes matched filter means for detecting said discrete loss in said optical signal.

17. The optical fault finder of claim 13 wherein said minimum value is about 3 decibels above the average background noise of said optical signal, and said maximum value is about 9 decibels above said average background noise.

18. The optical fault finder of claim 14 further comprising means for displaying said distance and said loss value.

19. The optical fault finder of claim 16 wherein said processing means further includes clipping filter means for removing said reflections from said optical signal prior to application of said matched filter means.

20. An optical time domain reflectometer comprising:
a variable pulse width laser diode;
a timer electrically connected to said laser diode for regulating the pulse width of any output of said laser diode;
an optical port for receiving an optical fiber which is to be tested;
a photodiode;
a three-way optical coupler having an input, a primary output, and a secondary output, said input being optically connected to said laser diode, said primary output being optically connected to said optical port, and said secondary output being optically connected to said photodiode;
amplifier/filter means for conditioning an optical signal detected by said photodiode, said optical signal resulting from backscattering and reflections caused by the propagation of a first light pulse through the optical fiber, said first light pulse having a known first pulse width;
an analog-to-digital converter connected to said amplifier/filter means;
a microprocessor connected to said timer and said analog-to-digital converter, said microprocessor including means for:
  detecting a discrete loss in said optical signal, said discrete loss corresponding to a fault in the optical fiber,
  computing an adjusted pulse width based on a signal level at said discrete loss and further based on the value of said first pulse width, said adjusted pulse width being (i) greater than said first pulse width if said signal level is less than about 3 decibels above the average background noise of said optical signal, or (ii) less than said first pulse width if said signal level is greater than about 9 decibels above said average background noise, and
  calculating (i) the approximate distance along the optical fiber to said fault, and (ii) the approximate value of said discrete loss;
means for displaying said distance and said loss value;
keyboard means for activating said microprocessor and for entering physical parameters used by said microprocessor;
memory means for storing program instructions carried out by said microprocessor; and
means for supplying power to said laser diode, said photodiode, said amplifier/filter means and said microprocessor.

21. The optical time domain reflectometer of claim 20 wherein said microprocessor further includes:
clipping filter means for removing said reflections from said optical signal; and
matched filter means for detecting said discrete loss in said optical signal and calculating said distance to said corresponding fault.

* * * * *